United States Patent [19]

Kumagai et al.

[11] Patent Number: 4,767,046
[45] Date of Patent: Aug. 30, 1988

[54] ASSEMBLY APPARATUS FOR MOTORCAR VEHICLE BODY

[75] Inventors: Kiyoshi Kumagai; Hiroshi Okuyama, both of Sayama, Japan

[73] Assignee: Honda Giken Kogyo Kabushiki Kaisha, Tokyo, Japan

[21] Appl. No.: 937,279

[22] Filed: Dec. 3, 1986

[30] Foreign Application Priority Data

| Dec. 3, 1985 | [JP] | Japan | 60-270832 |
| Dec. 3, 1985 | [JP] | Japan | 60-270833 |
| Dec. 17, 1985 | [JP] | Japan | 60-281960 |
| Dec. 19, 1985 | [JP] | Japan | 60-286672 |
| Dec. 28, 1985 | [JP] | Japan | 60-298429 |
| Jan. 9, 1986 | [JP] | Japan | 61-1411 |

[51] Int. Cl.⁴ .................................. B23K 37/04
[52] U.S. Cl. .................................. 228/4.1; 228/6.1; 228/47; 228/49.1; 29/33 P; 29/794; 29/822; 29/281.1
[58] Field of Search .................. 228/4.1, 5.1, 6.1, 47, 228/49.1, 57, 182, 212; 901/50; 29/33 K, 33 P, 564, 794, 822, 281.1, 429, 430

[56] References Cited

U.S. PATENT DOCUMENTS

| 3,968,558 | 7/1976 | Sekine et al. | 29/33 K |
| 4,332,012 | 5/1982 | Sekine et al. | 364/468 |
| 4,404,451 | 9/1983 | Niikawa et al. | 228/47 |
| 4,442,335 | 4/1984 | Rossi | 228/4.1 |
| 4,600,136 | 7/1986 | Sciaky et al. | 228/49.1 |
| 4,667,866 | 5/1987 | Tobita et al. | 228/49.1 |
| 4,682,722 | 7/1987 | Bossotto et al. | 228/4.1 |

Primary Examiner—Nicholas P. Godici
Assistant Examiner—Samuel M. Heinrich
Attorney, Agent, or Firm—Armstrong, Nikaido, Marmelstein & Kubovcik

[57] ABSTRACT

A pair of working lines for side panels are provided in parallel on the right and left sides of a main transfer line. Each working line includes, in the following order, a charging station, plural working stations, and a discharging station. A shuttle hanger conveyor extends from the charging to the discharging stations and has plural hangers movable on a conveying rail. Each hanger includes at least one vertically adjustable hook and a suppressing member for engaging the side panel and keep it from swinging. Each working station incudes a jig movable to take the side panel from the hanger and hold it in a preferred position. A transfer station is located adjacent the assembly station of the main transfer line. A discharging hanger conveyor is provided for moving the worked-on side panels from the discharging stations to the transfer station.

7 Claims, 18 Drawing Sheets

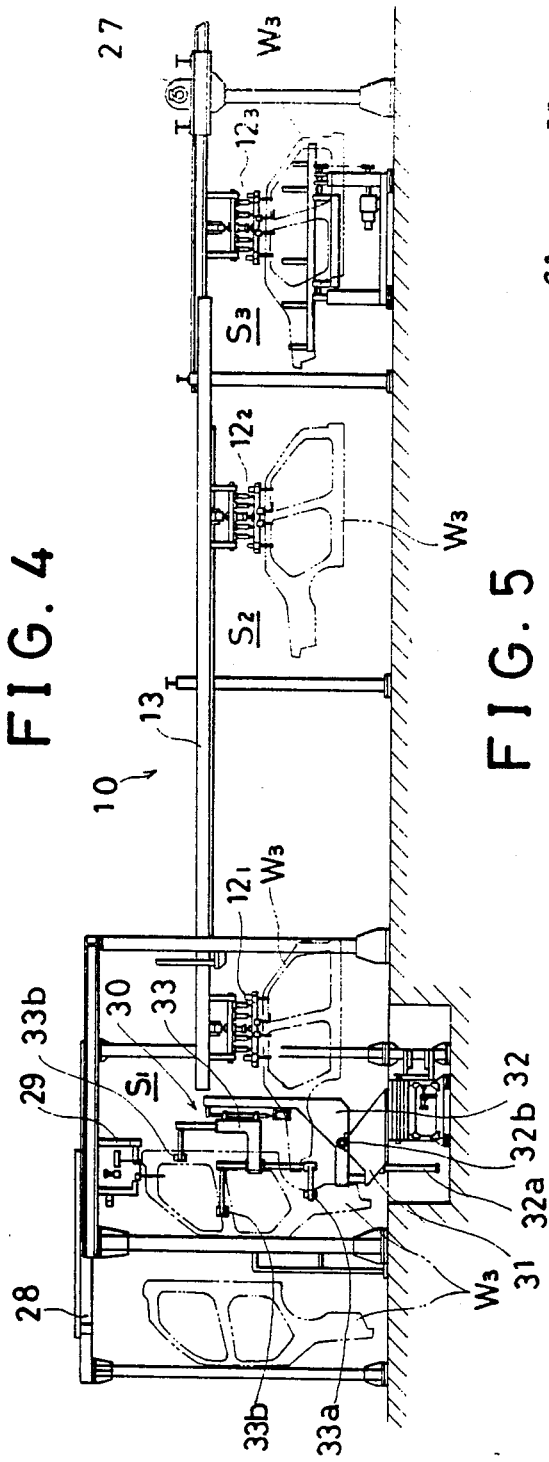
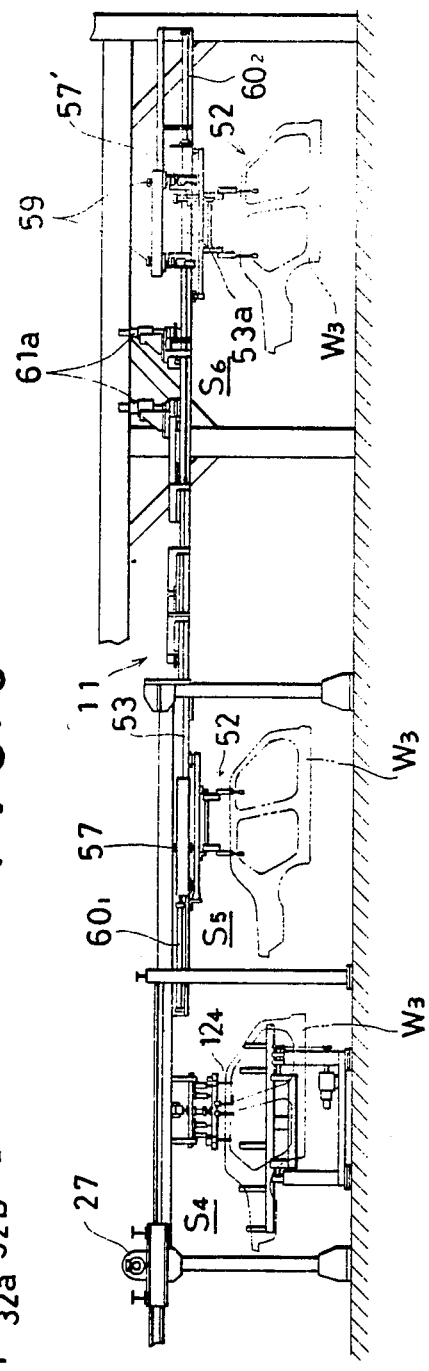

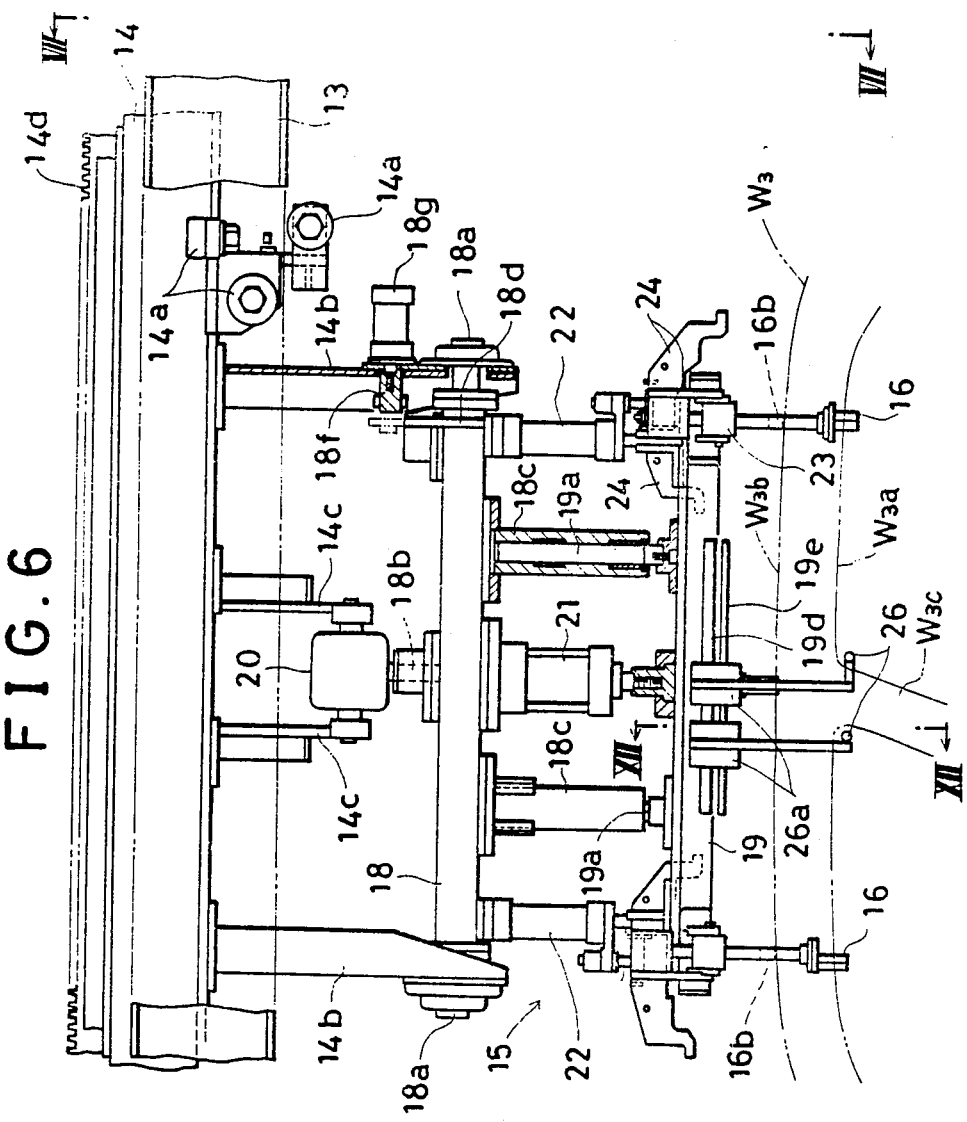

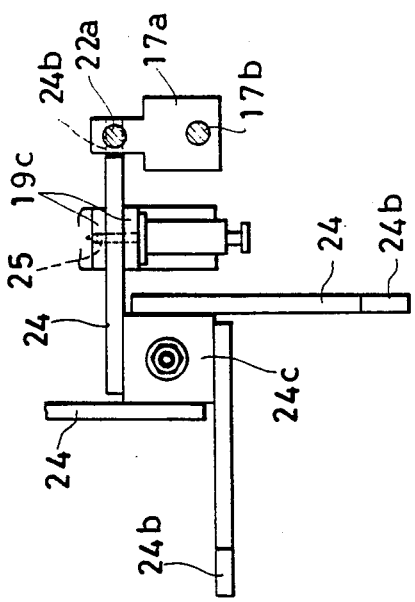
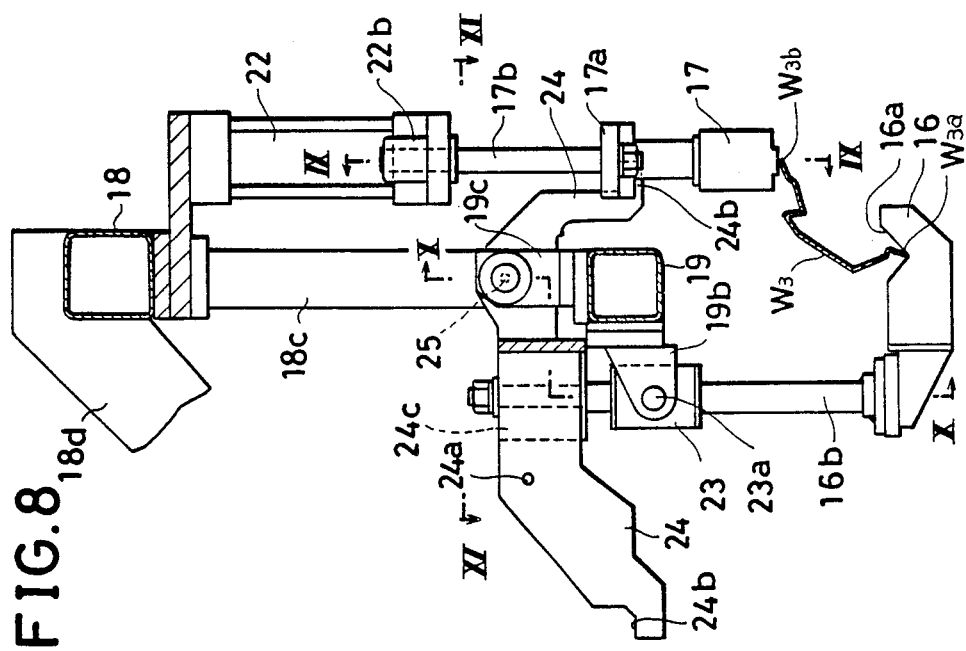

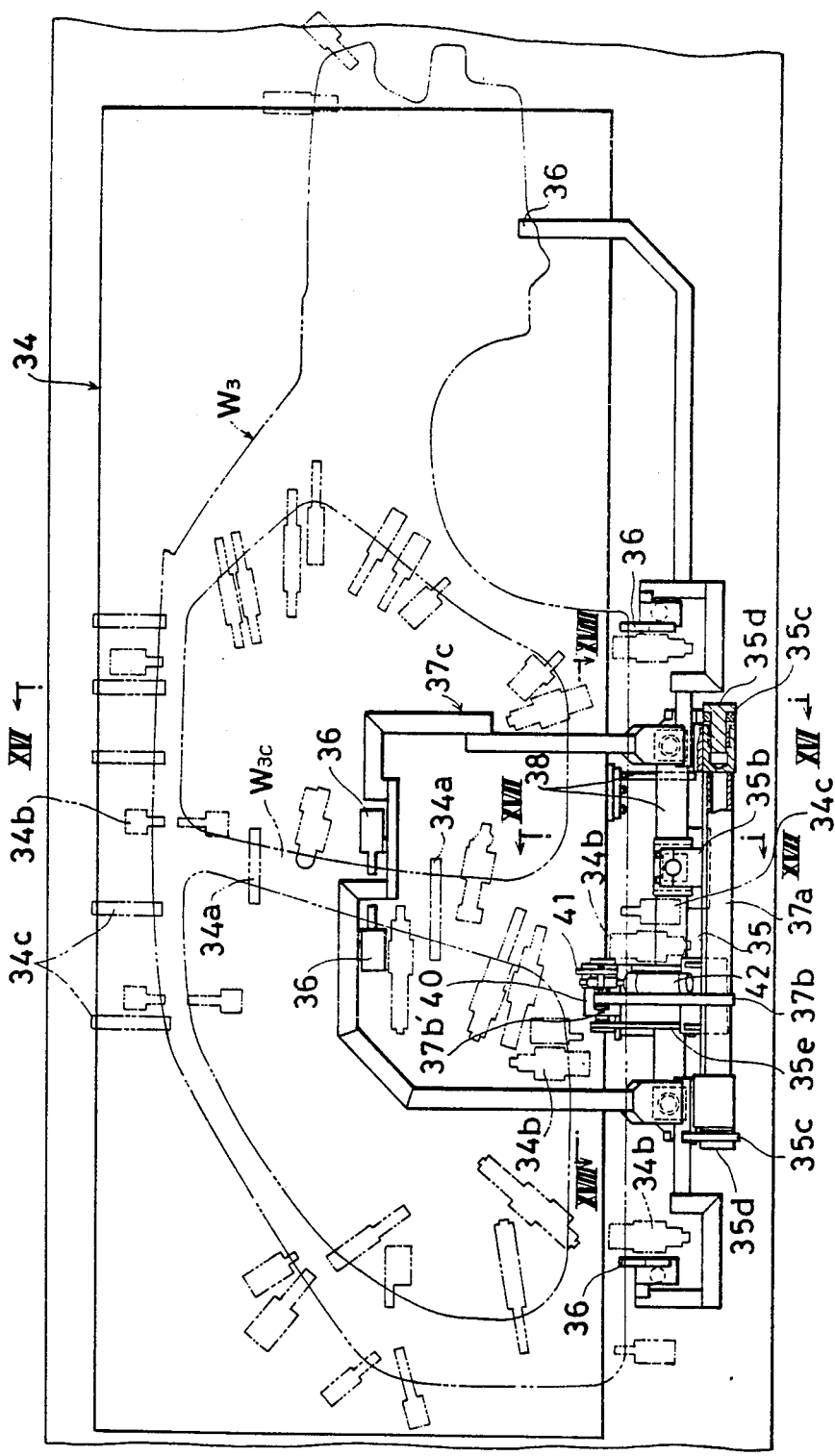

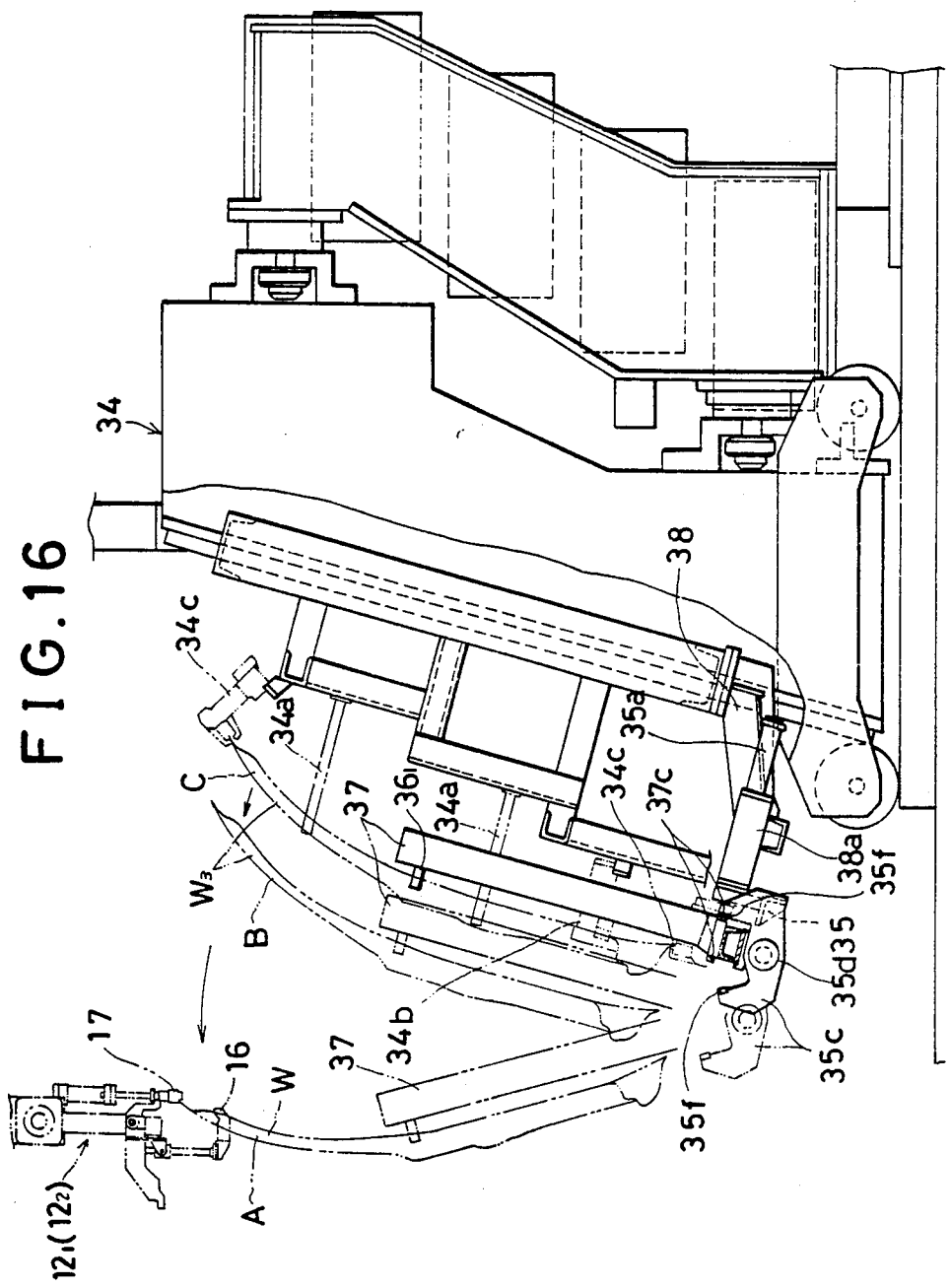

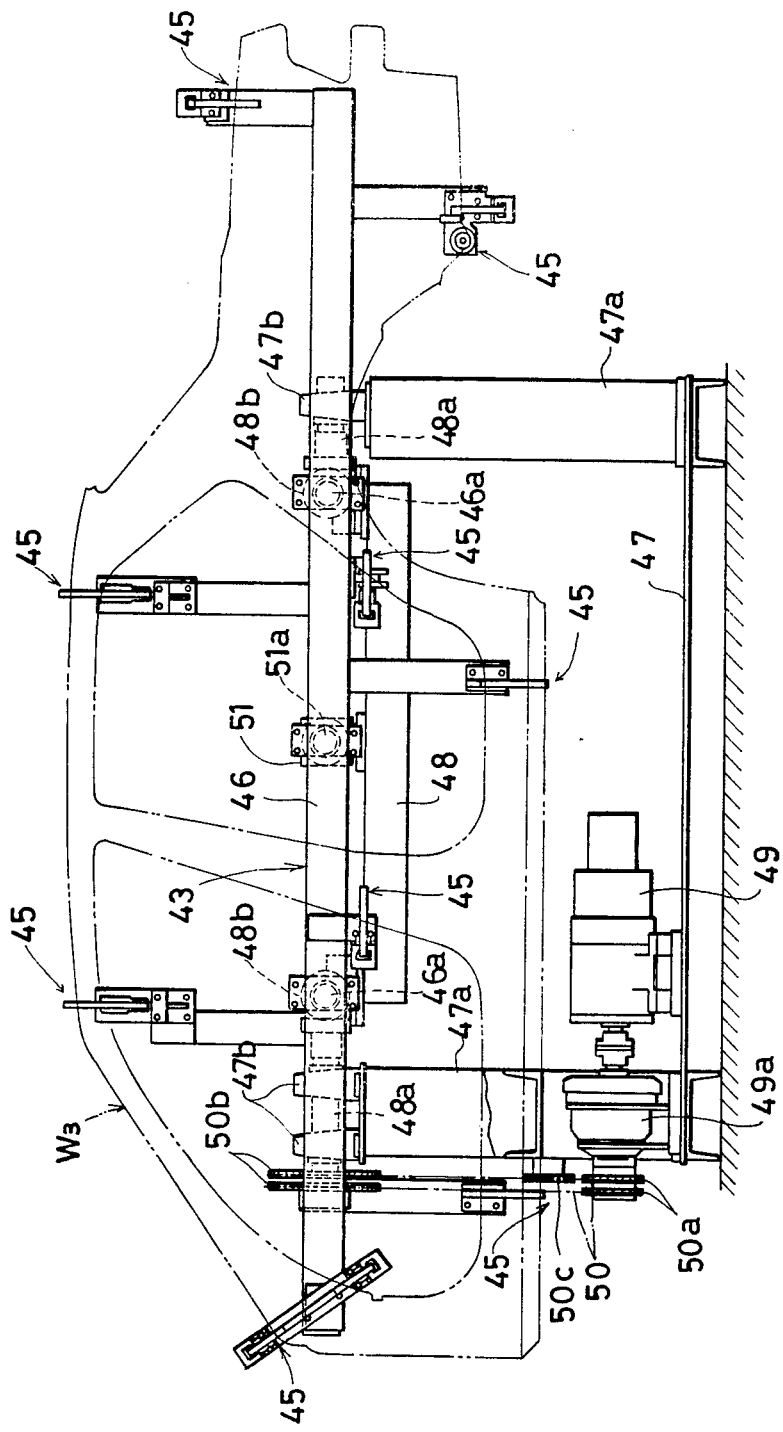

ASSEMBLY APPARATUS FOR MOTORCAR VEHICLE BODY

BACKGROUND OF THE INVENTION

This invention relates to an assembling apparatus for assembling a motorcar vehicle body by welding side panels on both left and right sides to floor and roof panels constituting component parts of a motorcar vehicle body.

The applicants of this application have previously proposed an apparatus as disclosed in Japanese patent Application Sho No. 60-73186, wherein a floor panel and a roof panel are conveyed from a set station into a vehicle body assembling station ahead of the set station through a conveying member which is reciprocatable between the two stations. Side panels on both left and right sides are welded to the floor and roof panels by a pair of welding jig means disposed on the left and right sides of the assembling station.

In this apparatus the side panel, prior to being conveyed to and set on the welding jig means, is subjected to a predetermined working which can include, welding of small parts thereto, applying of a sealing agent thereto, or the like. In this regard, it has been usual, as disclosed in Japanese Unexamined Patent Application Publication Sho No. 50-64982, to dispose a pair of working lines for working the side panels on the respective left and right sides in parallel one with another at a proper place in the assembly plant. In this manner the side panels on the respective working lines can be moved to the respective welding jig means on the left and right sides at the vehicle body assembling station, by respective hangers or the like.

It can be considered, that in the foregoing apparatus, a transfer line is provided for working on a floor panel. This transfer line extends rearwards from the set station so that the floor panel worked on while passing along the transfer line may be charged directly into the set station. Thus a linear main line results extending from the transfer line to the vehicle body assembling line. It is, however, desirable, in this case to dispose the working line for the side panels along the main line with an aim at making an efficient use of space on the floor of the assembly plant. Also, it is desirable to shorten the conveying distance from the working line to the welding jig means with an aim at decreasing equipment cost.

OBJECT AND SUMMARY OF THE INVENTION

According to this invention, for achieving the foregoing desires, an assembling apparatus for a motorcar vehicle body is provided wherein a floor panel and a roof panel are conveyed from a set station into a vehicle body assembling station ahead of the set station through a conveying member which is reciprocatable between the two stations. Side panels on both left and right sides are welded to those floor and roof panels by a pair of welding jig means provided on both left and right sides of the assembling station. The floor panel is introduced into the set station from a transfer line for floor panel working extending rearwards from the set station. The invention is characterized in that a pair of working lines for the side panels are disposed on both left and right sides of the transfer line so as to be in parallel therewith so that the side panel on each side worked on while passing along the working line on each side may be conveyed to the welding jig means on each side through a conveying line on each side extending forwards from the working line on each side.

Next, the operation of the apparatus of this invention will be explained as follows:

The side panel on each of left and right sides formed by pressing is applied with a predetermined working such as welding of small parts thereto, applying of a sealing agent thereto at each working line. The side panel on each side which has been worked on is conveyed to each welding jig means through each conveying line extending ahead of each working line.

On the other hand, the floor panel after being worked on is charged from the transfer line into the set station. Additionally, the roof panel conveyed by a hanger or the like from a separate line is charged into the set station. The two panels are introduced into the assembling station by the conveying member.

Under this condition, the side panel on each side held by the welding jig means on each side is assembled with and welded to the floor panel and the roof panel, whereby the motorcar vehicle body is assembled.

In this case, the working line for the side panel on one of left and right sides and the working line for the side panel on the other side are disposed on one side and the other side of the transfer line so that the side panel on each side may be worked on and be conveyed to the welding jig means on each side on each of left and right sides of the main line extending from the transfer line to the vehicle body assembling station located ahead of the transfer station. Consequently, it becomes unnecessary to convey the side panel across the main line from one side thereof, whereby the length of the conveying line can be shortened as much as possible to result in decrease in equipment cost. The working lines and the conveying lines for the side panels can be disposed compactly on both sides of the main line. Thus, the space needed for disposition of all of the lines can be decreased.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 4 and 5 are side views of a working line and a conveying line viewed from the respective lines IV—IV and V—V in FIG. 1;

FIG. 6 is a side view of a hanger provided on the working line;

FIG. 8 is an enlarged sectional front view of an important portion of the hanger;

FIGS. 9-11 are sectional views taken along the respective lines IX—IX-XI—XI in FIG. 8;

FIG. 12 is a sectional view taken along the line XII—XII in FIG. 6;

FIG. 15 is an enlarged side view of a welding jig means viewed from the direction of an arrow marked X in FIG. 14;

FIGS. 16–18 are sectional views taken along the respective lines XVI—XVI-XVIII—XVIII in FIG. 15;

FIG. 21 is a side view of a jig viewed from the direction of an arrow marked Y in FIG. 19;

DETAILED DESCRIPTION OF A PREFERRED EMBODIMENT

Figure 26:
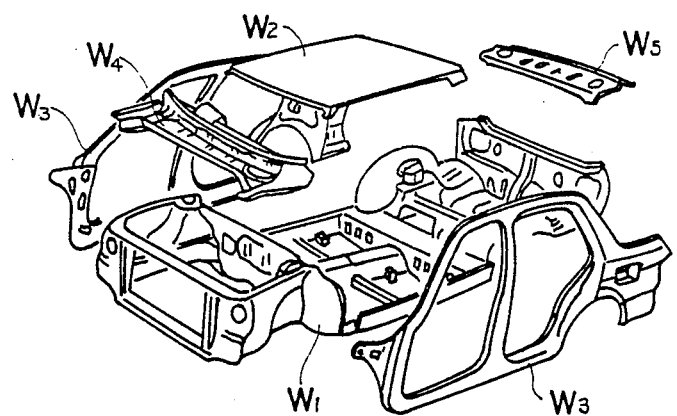
FIG. 26 is an exploded perspective view of a motorcar vehicle body.
Figure 22:
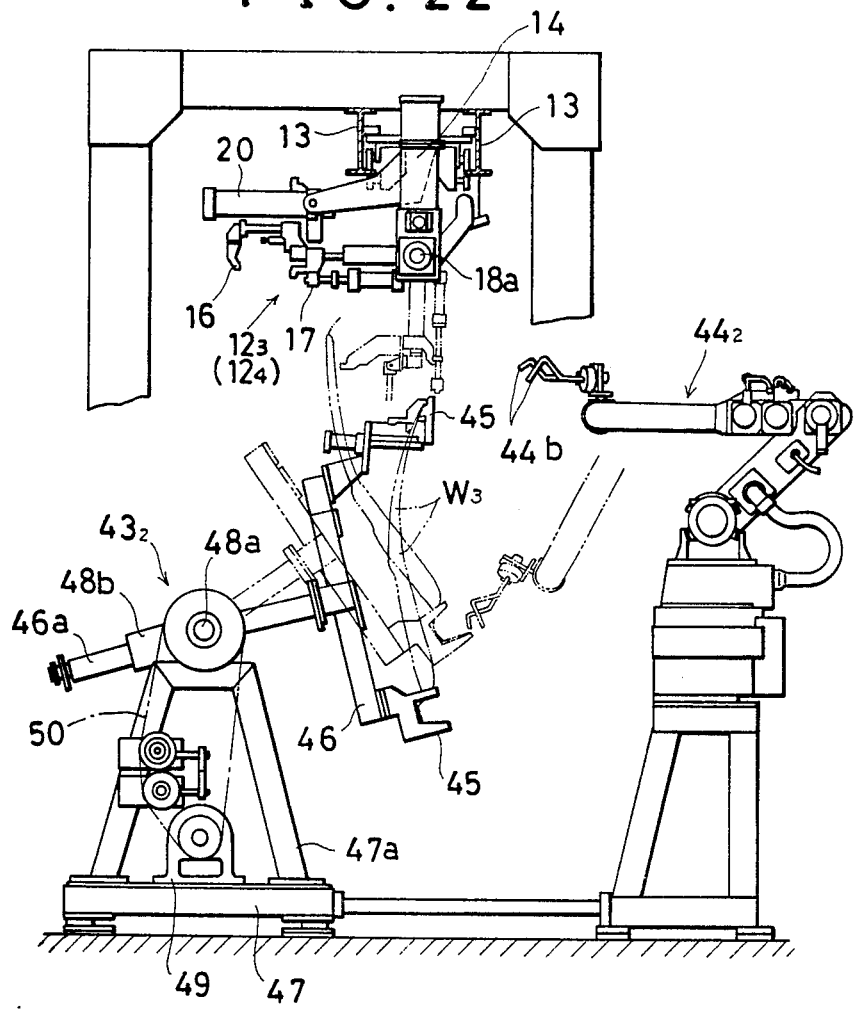
FIG. 22 is a front view of a coating station.

One embodying example of this invention will now be explained with reference to the accompanying drawings:

The illustrated embodying example shows an apparatus for assembling a motorcar vehicle body W by welding together component parts shown in FIG. 26, that is, a floor panel $W_1$, a roof panel $W_2$, left and right side panels $W_3$, $W_3$, a dash board upper piece $W_4$ and a rear tray member $W_5$.

Figure 2:
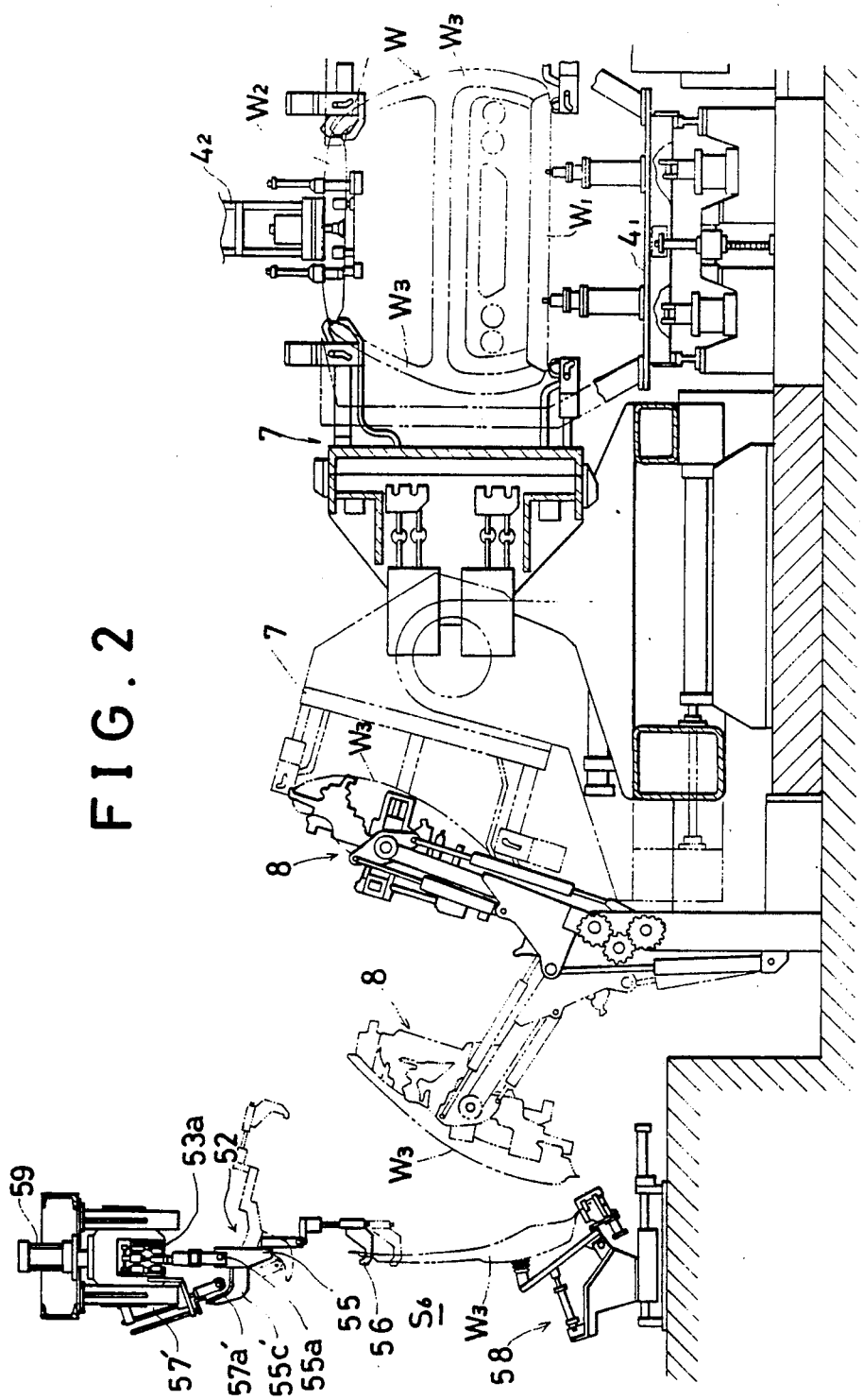
FIG. 2 is a sectional front view of a vehicle body assembling station viewed from the line II—II in FIG. 1.
Figure 3:
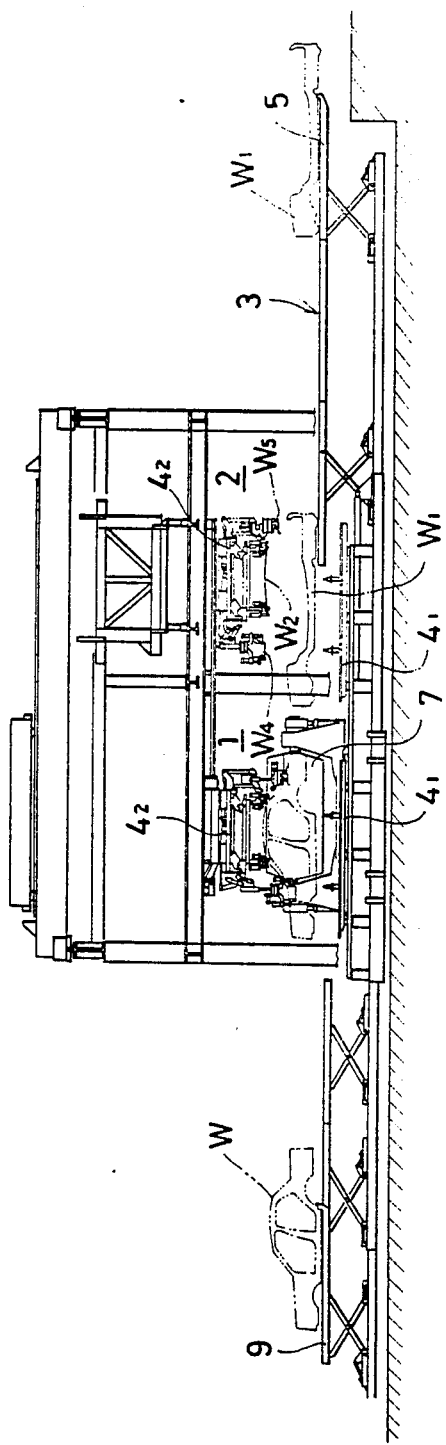
FIG. 3 is a sectional side view viewed from the line III—III in FIG. 1.

Referring to the drawings, a vehicle body assembling station 1 is provided with a set station 2 located in rear thereof. A transfer line 3 for transferring and working on floor panels extends rearwards from the set station 2. As shown in FIGS. 2 and 3, between the assembling station 1 and the set station 2, a conveying member comprising a lower carrier $4_1$ and an upper carrier $4_2$ is reciprocatably provided. The floor panel $W_1$ is charged into the set station 2 and mounted on the lower carier $4_1$ by a transfer bar 5 located on a front end of the transfer line 3. Additionally, a workpiece receiving means 6 which is movable to come in and out in relation to the set station 2 is provided on one side of the set station 2 so that the roof panel $W_2$ conveyed by a roof conveying means $C_1$ comprising an overhead conveyer is loaded on the workpiece receiving means 6 through a transfer means 6'. At the same time, the dash board upper piece $W_4$ and the rear tray member $W_5$ may be transferred to the workpiece receiving means 6 from a conveying means $C_2$ comprising an overhead conveyer. These three workpieces are charged into the set station 2 by the workpiece receiving means 6 and are received by the upper carrier 4.

The foregoing assembling station 1 is provided on both left and right sides thereof with a pair of welding jig means 7, 7, each being turnable between its inwardly directed welding position and its outwardly directed set position and also being movable to advance and retreat with respect to the assembling station 1 so that with each welding jig means 7 turned to its set position, the side panel $W_3$ on each of right and left sides may be set on each welding jig means 7 through a preset jig means 8 provided at the outside thereof, and by turning of each jig means 7 to its welding position and advancing thereof toward the station 1, the side panel $W_3$ on each side may be assembled and welded to the floor panel $W_1$, the roof panel $W_2$, the dash board upper piece $W_4$ and the rear tray member $W_5$ which have been previously charged into the assembling station 1 by the foregoing carriers $4_1$, $4_2$. The resultant motorcar vehicle body W thus assembled is conveyed out throuth a transfer bar 9 from the assembling station 1 to an additional welding station located ahead thereof.

This construction is not especially different from that in the foregoing one previously proposed. In the illustrated example, however, according to the characteristic features of this invention, a pair of working lines 10, 10 for working on the side panels $W_3$, $W_3$ are disposed on both left and right sides of the foregoing transfer line 3 so as to be in parallel therewith so that the side panel $W_3$ on each of right and left sides worked on at each working line 10 may be conveyed to each welding jig means 7 through a conveying line 11 on each of right and left sides extending forwards from each working line 10.

As shown in FIGS. 4 and 5, a charging station $S_1$, a first working station constituting a small parts temporary welding station $S_2$, a second working station constituting a small parts additional welding station $S_3$, a third working station constituting a sealing agent coating station $S_4$, and a discharging station $S_5$ are disposed in that order on the working line 10 on each side from its rear end to its front end. A shuttle type hanger conveyer is provided along each working line 10 comprising a first hanger $12_1$ which is reciprocatable between the charging station $S_1$ and the temporary welding station $S_2$, a second hanger $12_2$ which is reciprocatable between the temporary welding station $S_2$ and the additional welding station $S_3$, a third hanger $12_3$ which is reciprocatable between the additional welding station $S_3$ and the coating station $S_4$, and a fourth hanger $12_4$ which is reciprocatable between the coating station $S_4$ and the discharging station $S_5$. With this hanger conveyor, the side panel $W_3$ is conveyed from the charging station $S_1$ to the discharging station $S_5$ through the temporary welding station $S_2$, the additional welding station $S_3$ and the coating station $S_4$.

Figure 7:
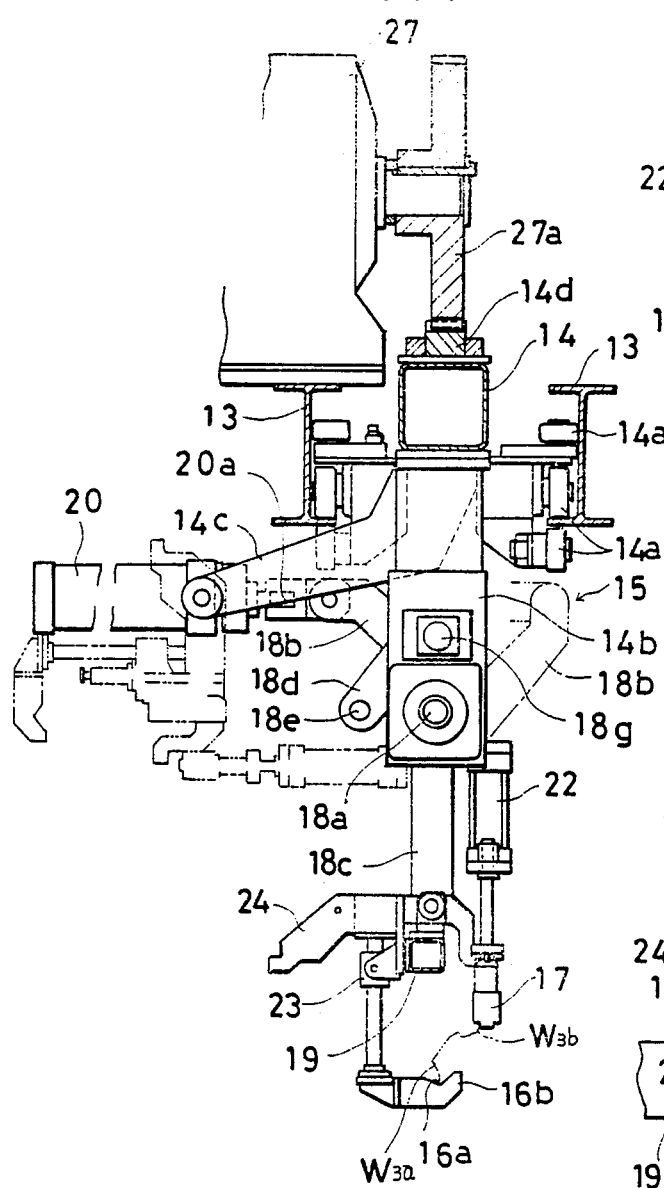
FIG. 7 is a sectional front view taken along the line VII—VII in FIG. 6.

As shown in FIGS. 6 and 7, each of the hangers $12_1$ ... $12_4$ is constructed having a conveying bar 14 supported through plural rollers 14a on each rail of a conveying railway 13 on the working line 10. The bar 14 is movable forwards and rearwards along the railway 13. A hanger main body 15 extends downwardly from the bar 14. A pair of front and rear hooks 16, 16 for supporting the side panel $W_3$ in a downwardly hanging condition by holding an opening edge $W_{3a}$ definging an upper side of the periphery of a door opening and a quarter window made therein are attached to the main body 15. Each hook 16 is provided with a V-shaped recess portion 16a for receiving an opening edge $W_{3a}$. A pair of front and rear suppressing members 17, 17 which are movable upwards and downwards and serve to engage from above an upper edge $W_{3b}$ of the side panel $W_3$ to suppress swinging are attached to the main body 15 so that the side panel $W_3$ may be set in position by the hooks 16, 16 in engagement of the opening edge $W_{3a}$ thereof with each recess portion 16a thereof. At the same time the side panel $W_3$ may be prevented from being inclining sideways or swinging about the opening edge $W_{3a}$ by the abutment between the suppressing members 17, 17 and the upper edge $W_{3a}$. Consequently the side panel W held in its downwardly hanging condition by each hanger $12_1$ ... $12_4$ at a predetermined position and in a predetermined posture, without chattering. In this manner, a transfer of the side panel $W_3$ to a working means provided at the temporary welding station $S_2$ or the like as described hereinafter can be carried out accurately, without using any special positioning means.

Additionally, in the illustrated example, the hanger main body 15 includes a rotary frame 18 supported on the conveying bar 14 rotatable about a longitudinally extending shaft 18a, and an elevating frame 19 supported on the rotary frame 18 movable upwards and downwards. The hooks 16, 16 are attached to the elevating frame 19.

More in detail, the conveying bar 14 is provided with a pair of front and rear leg members 14b, 14b extending downwards therefrom. The rotary frame 18 is rotatably supported between the two leg members 14b, 14b on the shafts 18a, 18a on both front and rear ends thereof. A rotary cylinder 20 is provided between a pair of brackets 14c, 14c extending laterally from a lower surface of the conveying bar 14. A piston rod 20a of the cylinder is connected to a first lever 18b projecting from a middle portion of the rotary frame 18 so that the rotary frame 18 is rotated about 90 degrees by operation of the cylinder 20. The rotary frame 18 is provided with a pair of front and rear guide sleeves 18c, 18c and an intermediate elevating cylinder 21 extending vertically downwards therefrom. The elevating frame 19 is provided with a pair of guide bars 19a, 19a which extend vertically upwards and are inserted into the respective sleeves 18c, 18c so that the elevating frame 19 is supported on the rotary frame 18 through the guide bars 19a, 19a and the cylinder 21 and is movable upwards and downwards. In this manner, the hanger main body 15 can swing between its downward operating position and its outwardly laterally oriented escaped position by a movement of the rotary frame 18. In addition, the hooks 16, 16 attached thereto can move upwardly and downwardly by movement of the elevating frame 19. A stopper cylinder 18g having a stopper pin 18f for engagement with an engaging opening 18e made in a second lever 18d projecting from an end poriton of the rotary frame 18 is attached to the leg member 14b so that the hanger main body 15 can be restrained at its escaped laterally oriented position by the cYlinder 18g. In this case, the foregoing suppressing member 17 may be provided on the elevating frame 19, but in the illustrated example, the same is attached to the rotary frame 18 through separate cylinders 22 so as to be movable upwards and downwards.

Figure 9:
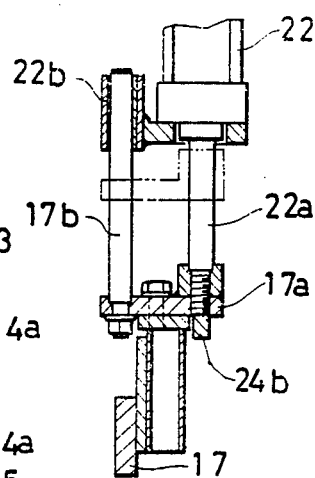

The details thereof are shown in FIGS. 8 and 9. Namely, each cylinder 22 is provided on an end portion of the rotary frame 18 projecting vertically downwards therefrom. The suppressing member 17 is attached on a seat plate 17a provided at its upper end to a piston rod 22a of the cylinder 22. A guide bar 17b projecting vertically upwards from the seat 17a is inserted through a guide sleeve 22b attached to an outside surface of a lower end portion of the cylinder 22 so that the suppressing member 17 is guided while being moved upwards and downwards vertically by operation of the cylinder 22.

Figure 10:
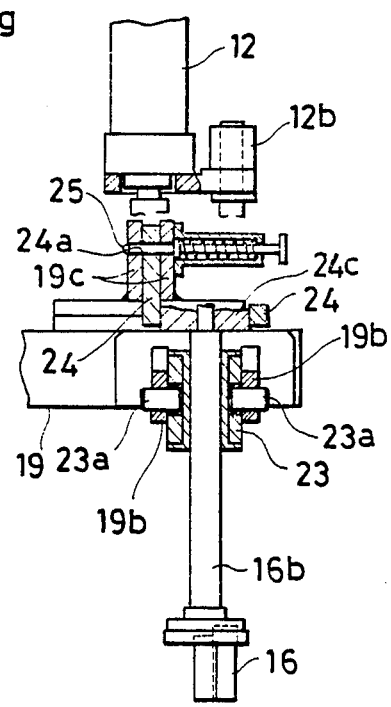

Each hook 16 has, as shown clearly in FIGS. 8 and 10, an attaching rod 16b projecting vertically upwards from a base end portion of the hook 16. The attaching rod 16b is inserted slidably upwards and downwards through a guide member 23 which is pivotally supported on a pair of longitudinal shafts 23a, 23a between a pair of brackets 19b, 19b provided on an outside surface of an end portion of the elevating frame 19. A positioning member 24 which is to be inserted between a pair of front and rear receiving members 19c, 19c provided on an upper surface of an end portion of the elevating frame 19 is attached to an upper end of the attaching rod 16b so that the hook 16 may be set in position at a predetermined position in the vertical direction and in the lateral direction and held there by a positioning pin 25 removably inserted into an engaging opening 24a made in the positioning member 24 and through corresponding openings in the two receiving members 19c, 19c. A stopper claw 24b projecting into an elevating locus of the seat plate 17a of the suppressing member 17 is provided on a forward end of the positioning member 24 so that the lowermost position of the suppressing member 17 is regulated by abutment of the seat plate 17a during the downward movement thereof with the stopper claw 24b to stop the member 17 at a predetermined position corresponding to the hook 16.

A plurality of differing positioning members 24 are provided on a holder 24c mounted on the attaching rod 16b projecting radially therefrom as shown in FIG. 11. These are provided so that when the assembling line is changed-over to produce a different model, including a different type of a side panel to be worked on, the position of the hook 16 and the lowermost position of the suppressing member 17 can be changed to handle the different type side panel. This is easily accomplished by turning the holder 24c so that any desired one in compliance with the type of the side panel selected from the plural positioning members 24 is inserted between the receiving members 19c, 19c. The positioning pin 25 is then mounted therein.

A pair of positioning rods 26, 26 are provided for forwardly and rearwardly positioning the side panel W with a center pillar $W_{3c}$ of the side panel $W_3$ being held from front and rear between the pair of positioning rods 26, 26. As shown in FIG. 12, an upper end portion of each of the rods 26 is attached to an L-shaped attaching plate 26a which is slidably supported on a forward and rearward extending longitudinally-extending guide rail 19d attached to an outside surface of the elevating frame 19. In this manner, each rod 26 can be fixed at a forward and rearward predetermined position in accordance with the type of the side panel to be worked on, by inserting an engaging pin 26b attached to a lower horizontal panel of the attaching plate 26a into any one of a plurality of openings formed at respective predetermined positions of an engaging a longitudinally-extending plate 19e attached to a lower surface of the elevating frame 19.

The foregoing second, third and fourth hangers $12_2$, $12_3$, $12_4$ are attached to their common conveying bar 14 having on its upper surface a rack 14 meshed with a pinion 27a mounted on an output shaft of an electric motor 27 provided at a position above an intermediate portion between the additional welding station $S_3$ and the coating station $S_4$. The first hanger 12 is attached to another conveying bar 14 arranged to be movable to reciprocate between the charging station $S_1$ and the temporary welding station $S_2$ by a driving source (not illustrated).

The charging station $S_1$ is so arranged that plural side panels $W_3$ previously formed by pressing are conveyed into the same through a charging rail 28 with the panels $W_3$ hanging down verticaly on a charging hanger 29.

The station $S_1$ is provided with a transfer means 30 so that each of the side panels $W_3$ may be transfered from the charging hanger 29 to the first hanger $12_1$.

Figure 13:
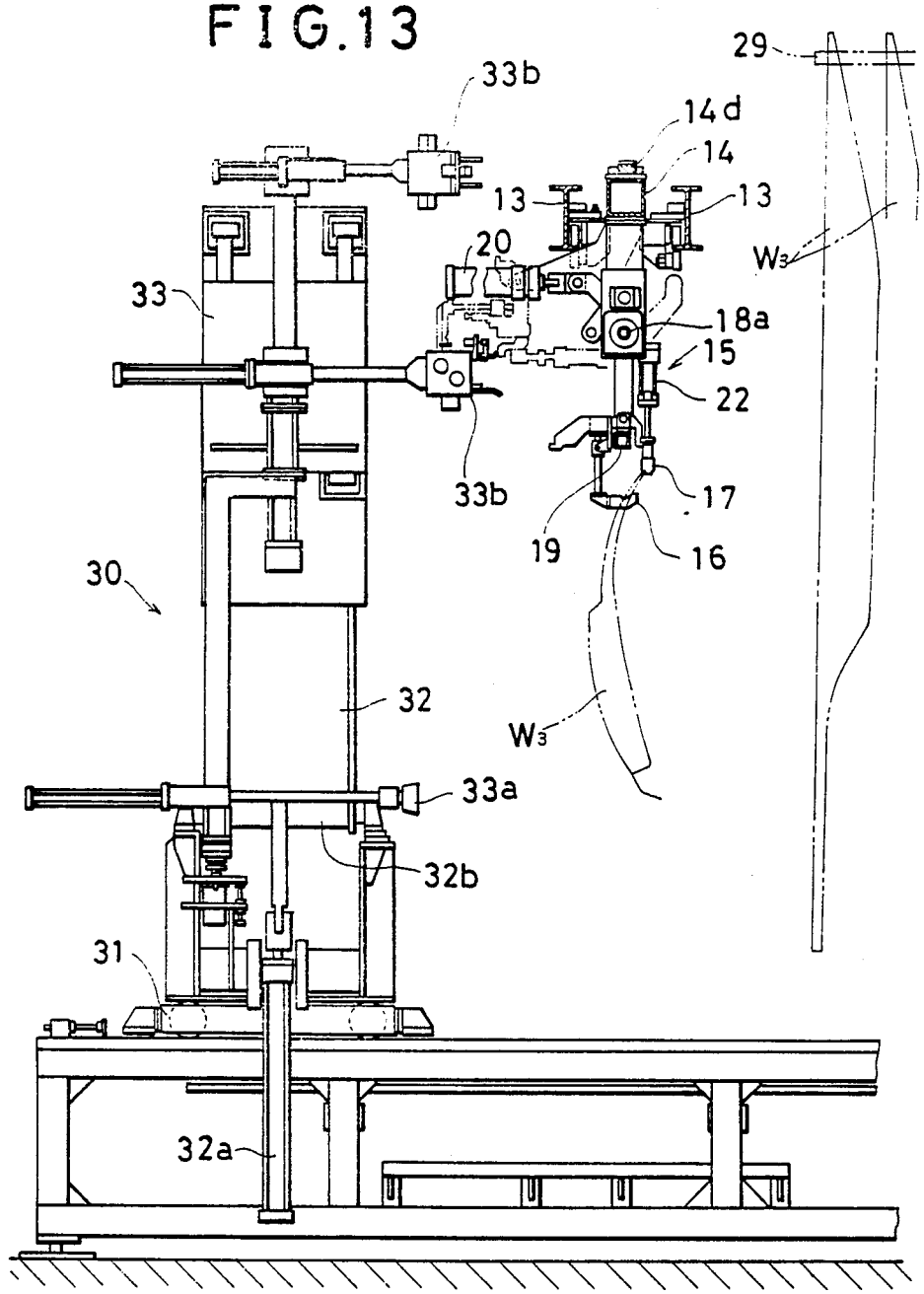
FIG. 13 is a rear side view of a charging station.
Figure 17:
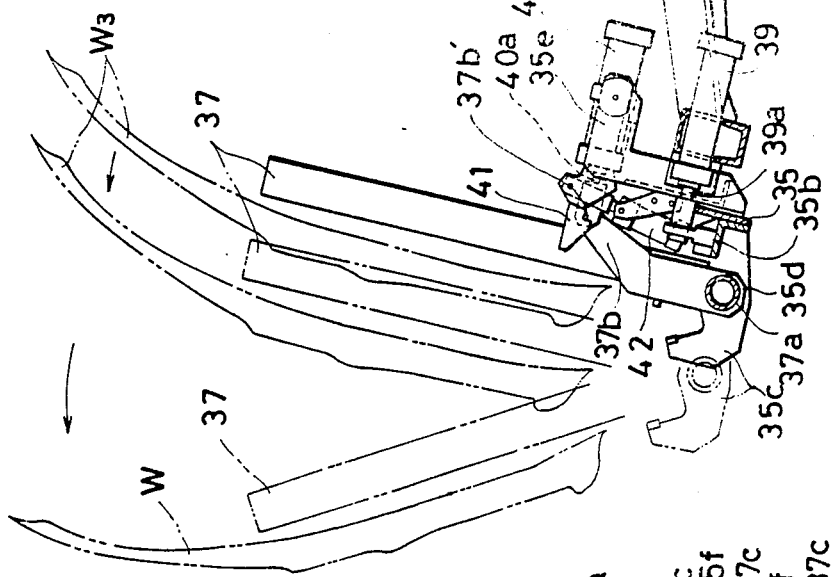

More in detail, as shown in FIGS. 4 and 13, the transfer means 30 includes a turning frame 32 which is turnable by 90 degrees between its raised position and its forwardly lowered position about a lateral directional shaft 32b by a cylinder 32a. The turning frame 32 is pivotally provided on a carrier 31 which is laterally movable. A jig frame 33 is mounted on the turning frame 32 and is movable upwards and downwards thereon while the turning frame 32 is in its raised position. The jig frame 33 is provided with a sucker pad 33a for vacuum-holding a rear fender section of the side panel $W_3$ and a pair of positioning members 33b, 33b for holding a sill section and a center pillar section of the side panel $W_3$ while positioning the side panel in its vehicle height direction and its vehicle length direction.

Thus, the carrier 31 is advanced inwards in the lateral direction with the turning frame 32 in its raised position so that the side panel $W_3$ hanging longitudinally downwardly from the charging hanger 29 can be grabbed by the jig frame 33 through the action of the sucker pad 33a and the two positioning members 33b, 33b. Then the jig frame 33 is moved upwards on the frame 32 and the carrier 31 is retreated outwardly in the lateral direction. In this manner, the side panel $W_3$ is then separated from the charging hanger 29. The turning frame 32 is then turned to its lowered position, so that the side panel $W_3$ may be transferred, in a horizontal posture, to the first hanger $12_1$.

The foregoing temporary welding station $S_2$ is provided with a welding jig means 34, as a working means, for temporarily welding such small parts as a side sill liner, a center pillar stiffener, a roof side rail or the like to the side panel $W_3$.

Figure 1:
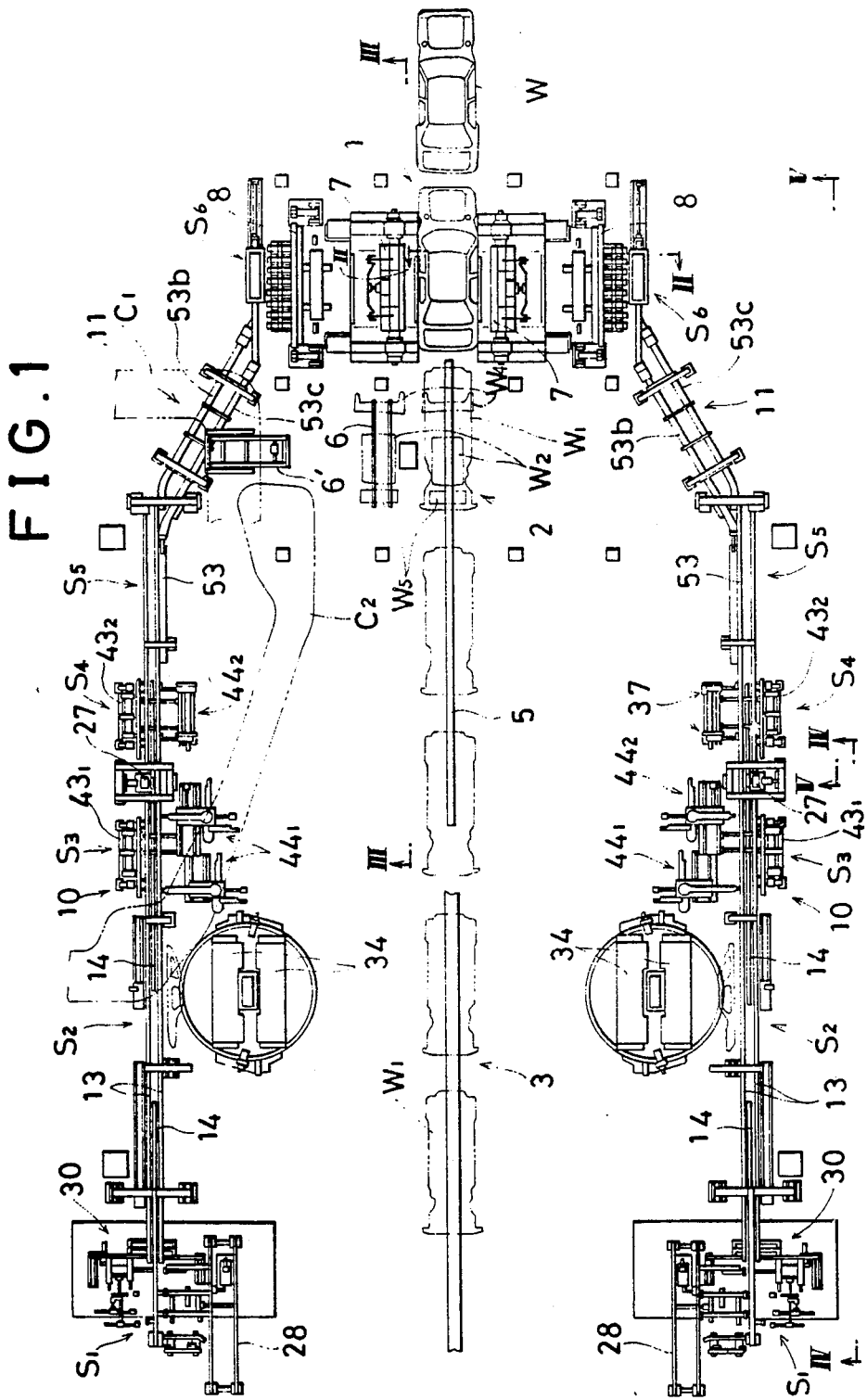
FIG. 1 is a top plan view showing a line layout of this invention.
Figure 14:
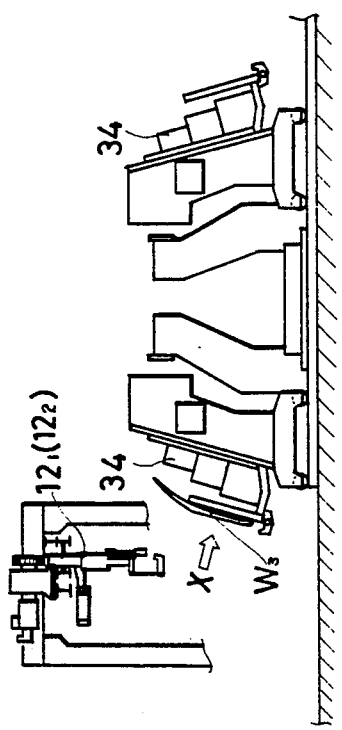
FIG. 14 is a front view of a temporary welding station.
Figure 18:
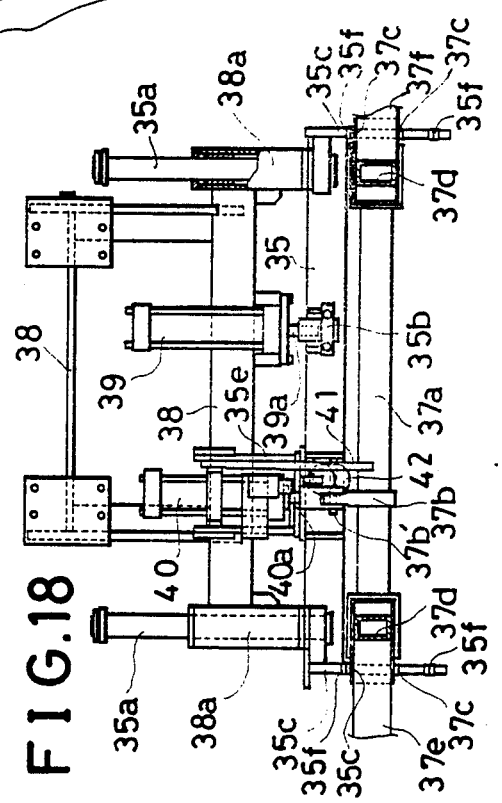

In the illustrated example, a pair of such welding jigs 34, 34 are provided at the inner side of the hanger stop position. Each welding jig 34 can be indexed between an outwardly directed operative position (the left side in FIG. 14) and an inwardly directed waiting position (the right side in FIG. 14), so that such either one of the welding jig means 34, 34 that corresponds to the type of the side panel $W_3$ may be selected to the inwardly directing operative position for carrying out the welding operation (see FIG. 1).

As shown in FIGS. 15 and 16, the welding jig 34 is provided with workpiece receiving members 34a, clamping members 34b and welding guns 34c so that the welding operation may be carried out by the welding guns 34c while the side panel W is held in an obliquely upwardly directed inclined posture.

Additionally, as shown in FIGS. 15-18, the welding jig 34 is provided with a movable frame 35 which is movable to advance and retreat in a direction normal to the jig 34, that is, obliquely upwards. A jig frame 37 having plural holding members 36 for holding the side panel $W_3$ is supported on the movable frame 35 and is tiltable relative thereto.

More in detail, a pair of front and rear guide sleeves 38a, 38a inclined obliquely and upwards are fixedly provided on a supporting frame 38 extending from a lower end of the welding jig 34. The movable frame 35 which is long in the longitudinal direction is slidabley mounted in and supported on the guide sleeves 38a, 38a on a pair of front and rear guide bars 35a, 35a fixed to the movable frame 35. A piston rod 39a of an advancing and retreating cylinder 39 attached to the supporting frame 38 is connected to a connecting member 35b provided on the movable frame 35 so that the movable frame 35 may be given obliquely upward advancing and retreating movements by operation of the cylinder 39. Additionally, longitudinal supporting shafts 35d, 35d are fixedly provided on fixed plates 35c, 35c provided on both front and rear ends of the movable frame 35. The jig frame 37 ia tiltably supported between the two supporting shafts 35d, 35d, on a longitudinal long shaft rod 37a provided on a lower end of the jig frame 37. A piston rod 40a of an inclination moving cylinder 40 attached to a bracket 35e on the movable frame 35 is connected to a lever 37b provided on an outer circumference of the shaft rod 37a so that the jig frame 37 may be given rightward and leftward inclination movements by operation of the cylinder 40. Each fixed plate 35c is provided with a pair of stoppers 35f, 35f for cooperating with left and right protrusions 37c, 37c attached to an upper part of an end portion of the shaft rod 37a so that the range of inclination movement of the jig frame 37 may be regulated by the abutment of each protrusion 37c with each stopper 35f. In this manner, the jig frame 37 may be inclined to a first posture corresponding to a hanging posture of the side panel $W_3$ on the hangers $12_1$, $12_2$ and a second posture corresponding to a set posture of the side panel $W_3$.

Referring to the drawings, a lock member 41 is arranged to be brought into engagement with a pin 37b' on the lever 37b for locking the jig frame 37 in its second posture. An operation cylinder 42 is provided for moving the lock member 41.

After the first hanger $12_1$ is advanced to and stopped at the temporary welding station $S_2$, the movable frame 35 is advanced obliquely upwards by operation of the cylinder 39. The jig frame 37 is then inclined to its first posture by operation of the cylinder 40 and is set in position at a position A shown in FIG. 16. The jig frame 37 is then brought along on the side panel $W_3$ hanging down at a predetermined posture on the first hanger $12_1$, where the side panel $W_3$ may be held on the jig frame 37 through the holding member 36.

Thereafter, the hanger main body 15 of the first hanger $12_1$ is moved to swing to its upward laterally oriented position with the hook 16 lowered. In this manner, the hanger $12_1$ may be separated from the side panel $W_3$. The jig frame 37 is moved to incline to the second posture, that is, the condition denoted by B in FIG. 16, and then the movable frame 35 is retreated obliquely downwards. The side panel $W_3$ is thus brought back to a set posture which is straight in relation to the welding jig 34, so that the obliquely upward posture thereof is kept as it is. As a result, at the position denoted by C in FIG. 16, the side panel $W_3$ is set accurately at the predetermined position on the welding jig 34 in its obliquely upwardly directed posture.

After the completion of the welding operation, the jig frame 37 is moved, by an operation reverse to that described above, in the order of C+B+A in FIG. 16, whereby the side panel $W_3$ is transferred to the third hanger $12_3$ moved rearwards to the temporary welding station $S_2$ and is then conveyed to the additional welding station $S_3$.

Figure 19:
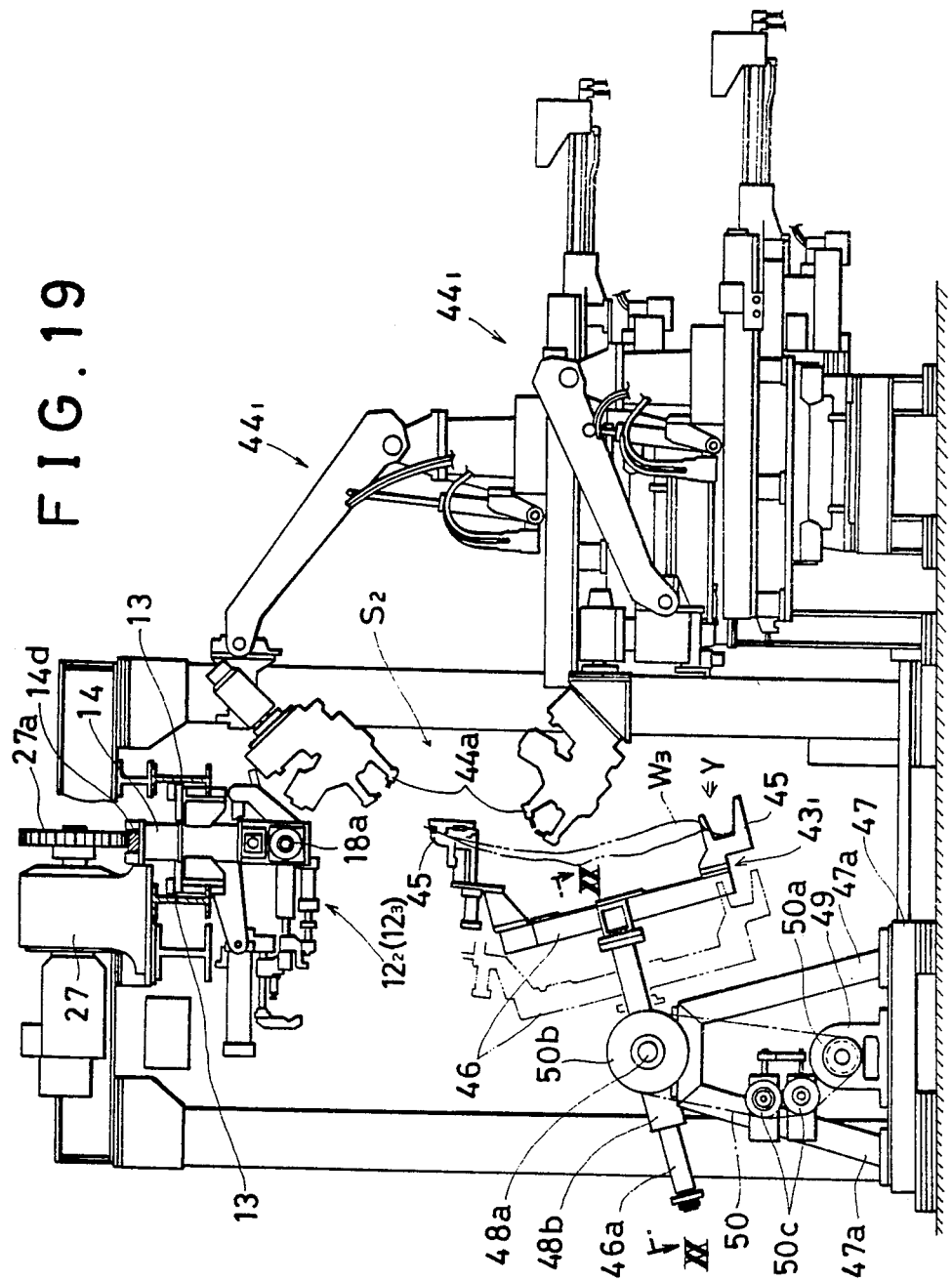
FIG. 19 is a front view of an additional welding station.

The additional welding station $S_3$ is constructed as shown in FIG. 19. A jig $43_1$ and a welding robot $44_1$ which has welding guns 44a mounted thereon are disposed on an outside and an inside of the hanger stop position as to face one another. The jig $43_1$ has a frame 46 having plural holding members 45 for holding the side panel $W_3$. The jig frame 46 supported on a swingable frame 48 swingably provided on a machine base 47 as to be movable to advance and retreat laterally.

Figure 20:
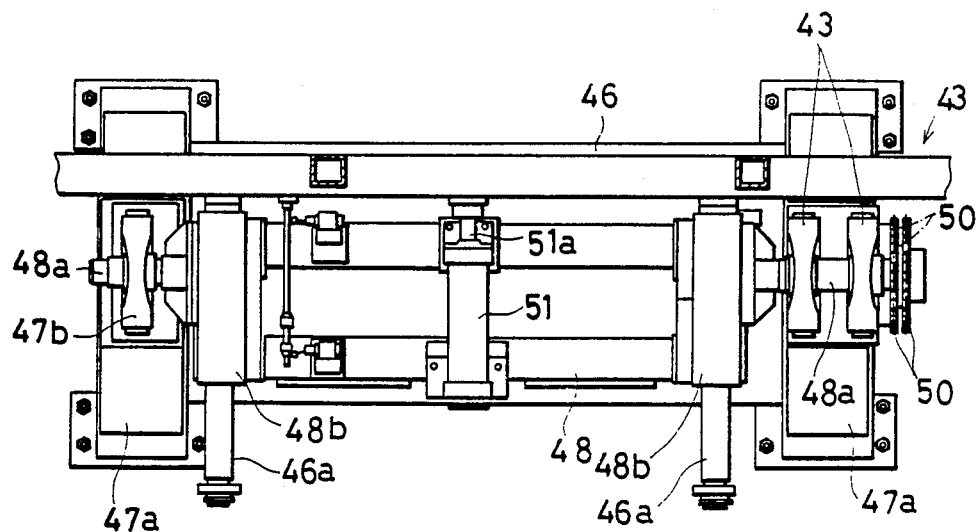
FIG. 20 is an enlarged sectional top plan view taken along the line XX—XX in FIG. 19.

The details thereof are as shown in FIGS. 20 and 21. Namely, a longitudinal long swingable frame 48 is supported, at longitudinal shafts 48a, 48a provided on both ends thereof, on bearings 47b, 47b provided on a pair of front and rear supporting legs 47a, 47a projecting upwards from the machine base 47. One of the shafts 48a, 48a is connected through a double chain 50 to an electric motor 49 mounted on a lower portion of the machine base 47 so that the swingable frame 48 may be given a swing movement about the shafts 48a, 48a by operation of the motor 49.

A driving sprocket 50a is connected to the motor 49 through a reduction gear 49a. A driven sprocket 50b is provided on the foregoing one of the shafts 48a, 48a. Tensioning sprockets 50c are provided to keep the double chain 50 tight.

A pair of front and rear guide sleeves 48b, 48b extending long in the longitudinal direction and a cylinder 51 located intermediate therebetween are attached to an upper surface of the swingable frame 48. The jig frame 46 extending long in the longitudinal direction is slidably mounted and supported on the guide sleeves 48b, 48b, on a pair of front and rear guide bars 46a, 46a provided on the jig frame 46. A piston rod 51a of a cylinder 51 is connected to the jig frame 46 so that the jig frame 46 can be advanced and retreated laterally by operation of the cylinder 51.

When the side panel $W_3$, is conveyed to the station $S_3$, the jig frame 46 is retreated to its waiting position shown by imaginary lines in FIG. 19 with the jig frame 46 being inclined, by movement of the swingable frame 48, to a predetermined transfer posture corresponding to a hanging down posture of the side panel $W_3$ on the hangers $12_2$, $12_3$. After the second hanger $12_2$ is advanced to and stopped at the additional welding station S, the jig frame 46 is advanced to its inward transferring positon shown by solid lines in the FIG. 19.

The respective holding members 45 attached to the jig frame 46 coincide with respective predetermined holding positions of the side panel $W_3$ hanging down from the second hanger $12_2$. The side panel $W_3$ is then held on the jig frame 46 through these holding members 45.

Then, the hanger main body 15 of the second hanger $12_2$ is moved to swing to its laterally oriented escaped position with the hook 16 lowered, whereby the hanger $12_2$ is separated from the side panel $W_3$ and transferring of the side panel $W_3$ to the jig $43_1$ is completed.

Thereafter, while the side panel $W_3$ is kept in its transfer position or while the same is changed in posture or in its position by swing movement of the swingable frame 48 or advancing and retreating movements of the jig frame 46, additional weldings of the small parts temporarily welded to the side panel $W_3$ at station $S_2$ are carried out by the welding robot $44_1$. After the completion of the additional welding operation, the jig frame 46 is set in position at the transfer position, and is kept in a predetermined posture. Then the side panel $W_3$ is transferred to the third hanger $12_3$ moved rearwards to the additional welding station $S_3$ by operations reverse to those as described before, and the side panel $W_3$ is then conveyed by the third hanger $12_3$ to the coating station $S_4$.

The coating station $S_4$ is so arranged that a jig $43_2$ similar to the foregoing jig $43_1$ and an application robot $44_2$ which has spraying nozzles 44b mounted theron are disposed on the outside and the inside of the hanger stop position to face one another so that the side panel $W_3$ conveyed into the station $S_4$ by the third hanger $12_3$ may be transferred to the jig frame 46 of the jig $43_2$ by substantially the same operation as above with respect to the jig $43_1$. Accordingly, a detailed description is not necessary. A sealing agent or an adhesive agent may be applied to joining portions of the side panel $W_3$ to the floor panel $W_1$, the roof panel $W_2$ or the like by the application robot $44_2$. Then the side panel $W_3$ applied with the coating may be transferred to the fourth hanger $12_4$ moved rearwards to the station $S_4$.

The foregoing conveying line 11 on each side is constructed so the side panel $W_3$ conveyed into the discharging station $S_5$ on the forward end of the working line 10 by the fourth hanger $12_4$ may be conveyed by a discharging hanger 52 to a transfer station $S_6$ on an outside portion of the assembling station 1.

Figure 23:
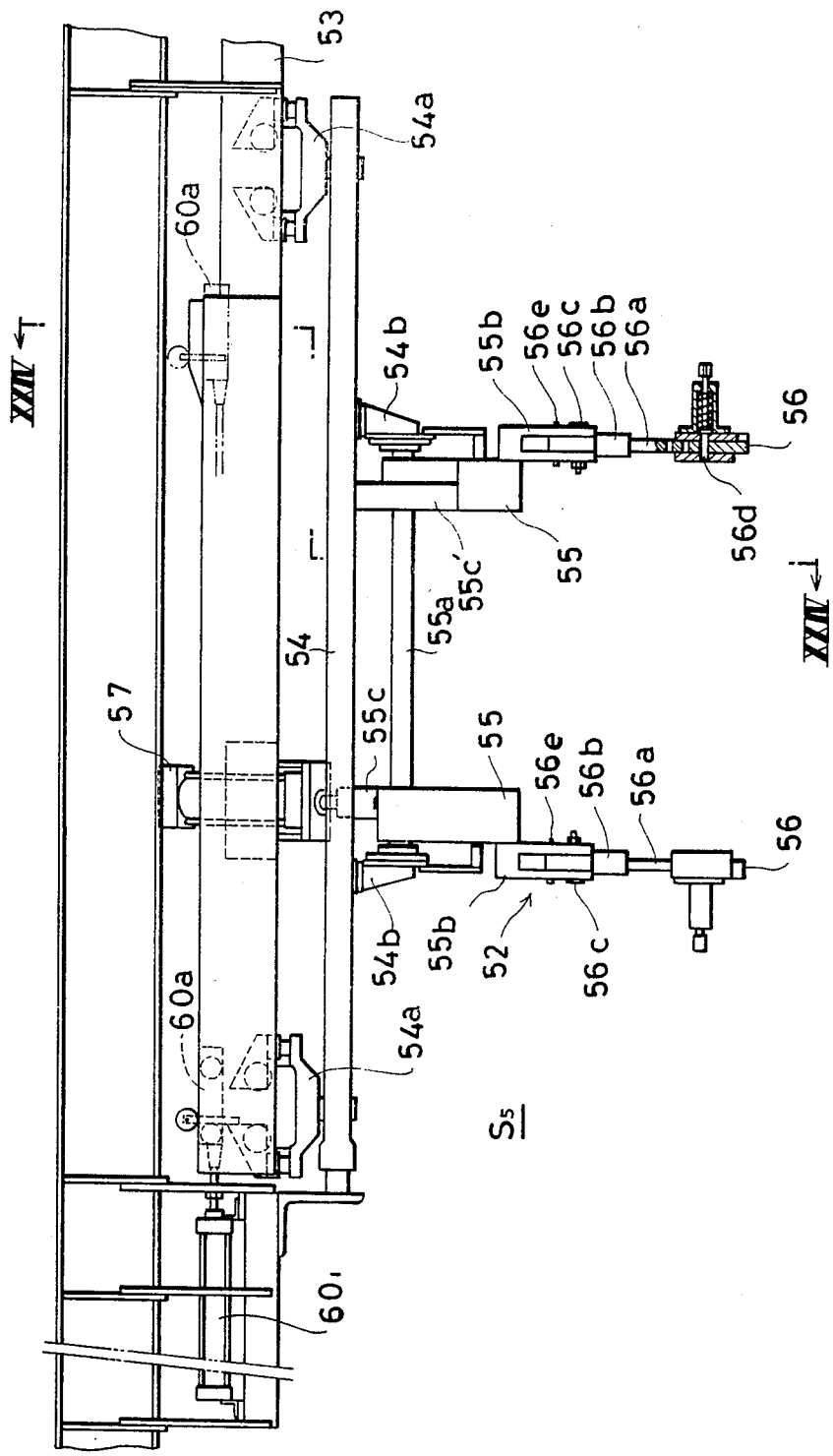
FIG. 23 is an enlarged side view of a discharging hanger.
Figure 24:
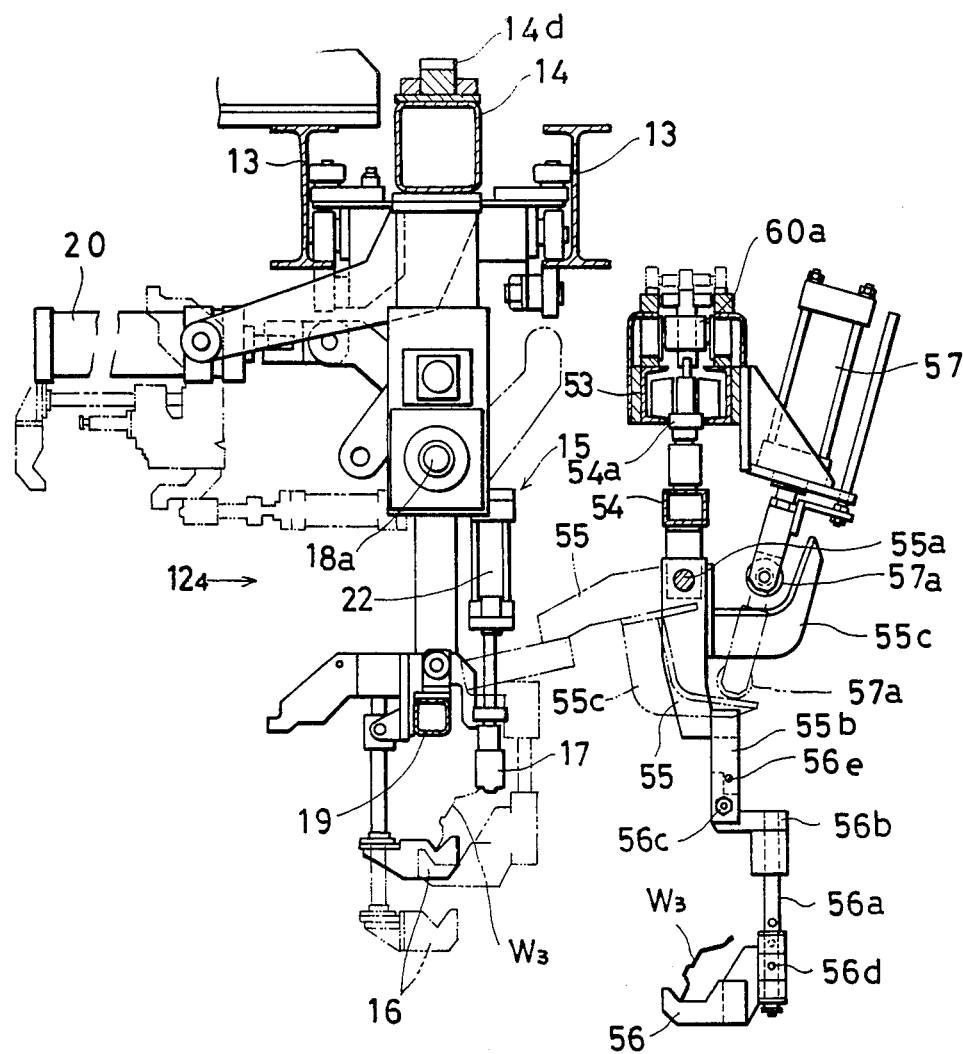
FIG. 24 is a sectional front view thereof taken along the line XXIV—XXIV in FIG. 23, with a fourth hanger being introduced into a discharging station.

The discharging hanger 52 is constructed as shown in FIGS. 23 and 24. A conveying bar 54 which is movably supported, through a pair of front and rear trolley portions 54a, 54a, on a conveying rail 53 on the conveying line 11 is provided with a pair of front and rear arms 55, 55 which are pivotally provided and swingable in a lateral direction. Hooks 56, 56 are pivotally attached to arms 55, 55. More in detail, a longitudinally extending long shaft 55a is turnably provided between a pair of front and rear brackets 54b, 54b on a lower surface of the conveying bar 54. Each arm 55 is combined at its upper end portion with the shaft 55a and is turnable therewith. Each hook 56 is pivotally attached, at a L-shaped fixing plate 56b fixed to an upper end of a rod 56a extending upwards from a rear end portion thereof, to a bifurcated pivotal attaching portion 55b provided on a lower end of each arm 55, by means of a longitudinal pivot shaft 56c so that the hook 56 may be hung down in its horizontal posture by the weight balance of the hook 56 including the rod 56a.

In order that the hook 56 may comply with a change in type of the side panel $W_3$, the hook 56 is brought into engagement with the rod 56a by inserting an engaging pin 56d into a desired one of plural holes made in the rod 56a so as to be adjustable in position in the vertical direction. Additionally, the pivotally attaching portion 55b is provided with a stopper pin 56e for preventing the hook 56 from being moved to incline in the clockwise direction in FIG. 24 by engagement of the pin 56e with an upright portion formed on an upper end of the fixing plate 56b.

The conveying railway 13 for the foregoing conveyer and the rail 53 for the discharging hanger 52 are disposed at the discharging station $S_5$ in parallel with each other in the lateral direction so that when the fourth hanger $12_4$ and the discharging hanger 52 are conveyed to the discharging station $S_5$, the two hangers $12_4$, 52 are disposed in parallel with each other in the lateral direction and are opposite one to another. The side panel $W_3$ may be transferred from the fourth hanger $12_4$ to the discharging hanger 52 by moving two arms 55, 55 of the discharging hanger 52 to swing towards the fourth hanger $12_4$ to one side of the lateral direction, that is, to the left side in FIG. 24.

A swing movement mechanism for the two arms 55, 55 is composed of a lever 55c provided on one of the two front and rear arms 55, 55, for instance, on the right side surface of the rear arm 55 as shown in FIG. 24, and a cylinder 57 attached to such a position of a rear portion of the conveying rail 53 that faces the lever 55c.

The two arms 55, 55 are moved to swing to the left shown ir FIG. 24 by pushing the lever 55c from above by a roller 57a attached to a piston rod of the cylinder 57. On this occasion, each hook 56 pivotally attached to the lower end portion of each arm 55 as mentioned above is moved to swing in the counterclockwise direction, in relation to each arm 55, about its pivot shaft 56c while being kept in its horizontal posture by its own weight. Thus, each hook 56 is moved, in parallel displacement fashion while being kept in its horizontal posture to a workpiece receiving position just below the opening edge $W_{3a}$ of the side panel $W_3$ hanging down from the fourth hanger 12$_4$, as shown by imaginary lines in FIG. 24.

After the arms 55, 55 are moved to swing as mentioned above, if the hooks 16, 16 of the fourth hanger 12$_4$ are lowered together with the elevating frame 19, the side panel $W_3$ is received, at its opening edge $W_{3a}$, on the foregoing hooks 56, 56. The arms 55, 55 are then turned back to the original position shown by solid lines in FIG. 24 transferring of the side panel $W_3$ to the discharging hanger 52.

In order that, at the time of lowering of the hooks 16, 16 of the fourth hanger 12$_4$, the hooks 16, 16 are prevented from being interfered with by the hooks 56, 56 of the discharging hanger 52, the hooks 16, 16 and the hooks 56, 56 are so stopped as to be more or less displaced one from another in the longitudinal direction in the course of that the two hangers 12$_4$, 52 are conveyed to and stopped at the discharging station $S_5$. Additionally, the side panel $W_3$ is so hung on the hooks 56, 56 of the discharging hanger 52 that the center of gravity of the side panel may be located on a vertical plane including an axis of the pivot shaft 56c for each hook 56, so that those hooks 56, 56 can be kept in their horizontal posture even after the side panel $W_3$ is hung thereon.

After the completion of the transfer of the side panel $W_3$ to the discharging hanger 52, the discharging hanger 52 is conveyed from the discharging station $S_5$ to a transfer station $S_6$ along on the conveying rail 53 by movement of the conveying bar 54.

In the transfer station $S_6$, as shown in FIG. 2, there is provided a transfer means 58 for setting the side panel $W_3$ onto the foregoing preset jig 8. The terminal end portion of the conveying rail 53 that is located above the transfer means 58 is constructed as a movable rail 53 which is movable upwards and downwards by an elevating cylinder 59 so that the side panel $W_3$ hanging down from the discharging hanger 52 may be received on the transfer means 58 by lowering of the movable rail 53a. Then the arms 55, 55 of the discharging hanger 52 swing in the direction which is opposite to the foregoing swing movement direction thereof at the discharging station $S_5$, that is, to the right as shown in FIG. 2 for being separated therefrom, and from this retreated condition, the side panel $W_3$ may be transferred from the transfer means 58 to the preset jig 8.

The swing movement of the arms 55, 55 to the right is carried out by pushing a lever 55c' provided on the left side surface of the front arm 55 from above by a roller 57a' attached to a piston rod of a cylinder 57' mounted on the foregoing movable rail 53a. On this occasion, each hook 56 is prevented from its swing movement in the clockwise direction in relation to each arm 55 by the stopper pin 56e, so that the hook 56 is not kept in its horizontal posture but is moved to swing upwards to the right together with each arm 55.

Figure 25:
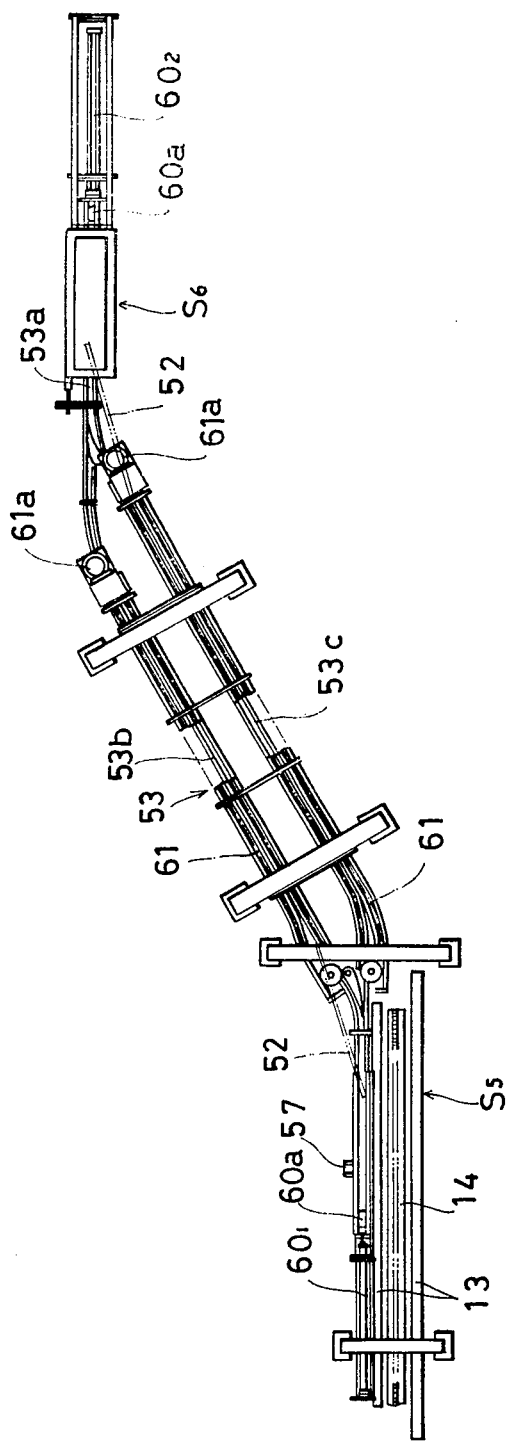
FIG. 25 is an enlarged top plan view of a conveying line.

As shown in FIG. 25, an intermediate portion of the conveying rail 53 is divided into a going passage 53b and a returning passage 53c. A pair of discharging hangers 52, 52 are disposed over the conveying railway 53 so that, when one of the discharging hangers 52, 52 is moved to go through the going passage 53b from the discharging station $S_5$ to the transfer station $S_6$, the other thereof may be moved to return through the returning passage 53c to the discharging station $S_5$.

In this case, respective conveying cylinders 60$_1$, 60$_2$, each being connected to an engaging member 60a for the foregoing trolley portion 54a, are provided in rear of the starting end portion of the conveying railway 53 and in front of the final end portion of the same so that each discharging hanger 52 may be moved to come in and out from each station $S_5$, $S_6$ to the going passage 53b and the returning passage 53c, and also the same may be conveyed through the going passage 53b and the returning passage 53c by means of respective chain conveyors 61 on the going passage 53b and on the returning passage 53 which are arranged to be driven by respective motors 61a, 61a.

Thus, after the side panel $W_3$ on each side is applied with a predetermined working as mentioned above at the working line 10 on each side of the transfer line 3, the same is conveyed to the transfer station $S_6$ on each side of the vehicle body assembling station 1 through each conveying line 11 extending forwards from each working line 10, and then is set on the welding jig 7 on each side through the preset jig 8 from the transfer means 58 disposed at each transfer station $S_6$. Then the side panel is assembled with and welded to the floor panel $W_1$, the roof panel $W_2$, the dashboard upper piece $W_4$ and the rear tray member $W_5$ conveyed into the assembling station 1 from the set station 2 ahead thereof, whereby the motorcar vehicle body W may be constructed.

Thus according to this invention, the working lines and the conveying lines for the left and right side panels can be disposed compactly on both sides of the linear main line extending from the transfer line for floor panel working to the vehicle body assembling line, so that the disposed space of the whole of the lines can be decreased, the conveying lines can be shortened in length, and the equipment cost can be lowered.

It is readily apparent that the above-described assembling apparatus for motorcar vehicle body meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An assembly apparatus for a motorcar vehicle body of the type that a floor panel and a roof panel are conveyed from a set station into a vehicle body assembling station ahead of the set station through a conveying member which is reciprocatable between the two stations, and side panels on both left and right sides are welded to those floor and roof panels by means of a pair of welding jig means provided on both left and right sides of the assembling station, and the floor panel is charged into the set station from a transfer line for floor panel working extending rearwards from the set station, characterized in that a pair of working lines for the side panels are disposed on both left and right sides of the transfer line in parallel therewith so that the side panel on each side after being worked on while passing along the working line on each side may be conveyed to the welding jig means on each side through a conveying line on each side extending forwards from the working line on each side;

the working line on each side comprises a charging station on its rear end, a discharging station on its front end, longitudinally disposed plural working stations intermediate therebetween, and shuttle hanger conveyor means for conveying said side panels from the charging station to the discharging station through the respective working stations, said hanger conveyor means having plural hangers and a conveying rail, each hanger being reciprocatable between adjacent stations; each of the hangers comprising a conveying bar supported on said conveying rail, a hanger main body hanging down from said conveying bar, at least one hook on said main body having a V-shaped recess portion for receiving an opening edge of the side panel, and at least one suppressing member adjacent said hook on said main body and movable upwardly and downwardly so as to be brought from the above into abutment with an upper edge of the side panel so that the side panel may be transferred between a working means provided on each of the working stations and each of the hangers.

2. An assembling apparatus as claimed in claim 1, wherein the hanger main body comprises a shaft extending in parallel to said longitudinally disposed plural working stations, a rotary frame pivotally supported on the conveying bar and rotatable about said sahft, and an elevating frame supported on the rotary frame and movable upwards and downwards, said hook being attached to the elevating frame.

3. An assembling apparatus as claimed in any one of claims 1 or 2, wherein said hanger main body further includes a guide member for supporting the hook, an attaching rod extending upwards from the hook rotatably inserted through the guide member and movable upwards and downwards, said guide member being pivotally supported on the hanger main body as to be turnable about a longitudinal shaft, and plural positioning members attached to an upper end of the attaching rod, each positioning member having an engaging opening for being engaged by a positioning pin provided on the hanger main body, and a stopper claw arranged to engage the suppressing member in order to regulate its lowermost position.

4. An assembling apparatus as claimed in any one of claims 1 or 2, wherein a working means provided in any of the foregoing working stations includes a jig for setting the side panel thereon in an obliquely upwardly inclined posture, said jig being provided on a side of a hanger stop position at that working station, said jig comprising a movable frame which is movable to advance and retreat obliquely upwards, and a jig frame having plural holding members for the side panel supported on the movable frame and tiltable to be brought into respective postures corresponding to a hanging posture of the side panel by the hanger and a set posture of the side panel to the welding jig.

5. An assembling apparatus as claimed in any one of claims 1 or 2, wherein a working means provided in any of the foregoing working stations comprises a jig and at least one robot disposed on one side and the other side of a hanger stop position in the working station and face one another, and the jig comprises a machine base, a longitudinally directed shaft on said base, a swingable frame pivotally mounted on said base and swingable about said shaft, and a jig frame having plural holding members for the side panel supported as to be movable to advance and retreat in a lateral direction on said swingable frame.

6. An assembling apparatus as claimed in claim 1, wherein the working line on each side further comprises a transfer station located outside the foregoing assembling station, and a discharging hanger conveyor means for conveying the side panel from the foregoing discharging station to said transfer station, said discharging hanger conveyor means including a conveying rail and at least one discharging hanger, said conveying rail for said shuttle hanger conveyor means and said conveying rail for said discharging hanger conveyor means being disposed on one side and the other side in a lateral direction of the discharging station so that the foremost hanger of the shuttle hanger conveyor means and the at least one discharging hanger are disposed on one side and the other side in the lateral direction of the discharging station and face one another, and the at least one discharging hanger has at least one arm which is laterally swingable, and a hook pivotally attached to a lower end of the arm so that, by a swing movement of the arm towards one side in the lateral direction, the hook may be moved, in parallel displacement fashion, to a workpiece receiving position located just below a predetermined hanging position of the side panel hanging down from the foremost hanger of the shuttle hanger conveyor means, and the hook provided on the foremost hanger of the shuttle hanger conveyor means is movable upwards and downwards so that in a lowering movement of the hook, the side panel may be received by the hook of the at least one discharging hanger located at the receiving position.

7. An assembling apparatus as claimed in claim 6, wherein the transfer station includes transfer means for receiving the side panel hanging down from the discharging hanger so that the side panel may be set on the welding jig through the transfer means.

* * * * *